US012658036B2

(12) United States Patent
Witt

(10) Patent No.: US 12,658,036 B2
(45) Date of Patent: Jun. 16, 2026

(54) TERRESTRIAL TO AEROSPACE DATA-BASED MODEL SYSTEMS AND METHODS

(71) Applicant: Anno.ai, Inc., Duluth, MN (US)

(72) Inventor: Steven Charles Witt, Minnetonka, MN (US)

(73) Assignee: Anno.ai, Inc., Duluth, MN (US)

( * ) Notice: Subject to any disclaimer, the term of this patent is extended or adjusted under 35 U.S.C. 154(b) by 332 days.

(21) Appl. No.: 18/186,287

(22) Filed: Mar. 20, 2023

(65) Prior Publication Data

US 2023/0298462 A1    Sep. 21, 2023

Related U.S. Application Data

(60) Provisional application No. 63/321,265, filed on Mar. 18, 2022.

(51) Int. Cl.
*G08G 1/017* (2006.01)
*G06V 20/17* (2022.01)
(52) U.S. Cl.
CPC ........... *G08G 1/0175* (2013.01); *G06V 20/17* (2022.01)
(58) Field of Classification Search
CPC ......... G06V 20/17; G06V 20/10; G06V 20/54
See application file for complete search history.

(56) References Cited

U.S. PATENT DOCUMENTS

| | | | | |
|---|---|---|---|---|
| 10,984,275 B1* | 4/2021 | Campbell | ........ | H04N 21/42202 |
| 2015/0146924 A1* | 5/2015 | Kihara | ................. | G06V 10/764 |
| | | | | 382/103 |
| 2020/0201344 A1* | 6/2020 | Viswanathan | ....... | G05D 1/0088 |
| 2020/0364247 A1* | 11/2020 | Van Sickle | ............ | G06V 10/82 |
| 2022/0139213 A1* | 5/2022 | Flade | ..................... | G06V 20/13 |
| | | | | 701/118 |
| 2022/0366167 A1* | 11/2022 | Desai | ..................... | G06V 20/13 |
| 2024/0029391 A1* | 1/2024 | Satoh | ...................... | H04N 7/18 |

* cited by examiner

*Primary Examiner* — Molly Wilburn
(74) *Attorney, Agent, or Firm* — Faegre Drinker Biddle & Reath LLP

(57) ABSTRACT

An imager such as a camera or other suitable device capable of identifying objects, including vehicles, using a variety of techniques. In one form the imager is a roadside camera situated to capture passing vehicles and identify the vehicles. The identification can be accomplished using license plate readers, etc., and can also include the identification of the type of vehicle, color, configuration, etc. The object imaged by the roadside camera can be matched with the object captured using an airborne or orbital imager. Such matching permits the object to be labelled in the images captured from the airborne or orbital imagers, using either the identification of the object or a characteristic of the object. Labelling the object also permits training of a data-driven model using images from the airborne or orbital imagers so that subsequent identification of the objects can be made using the airborne or orbital images with or without the terrestrial based imager.

20 Claims, 4 Drawing Sheets

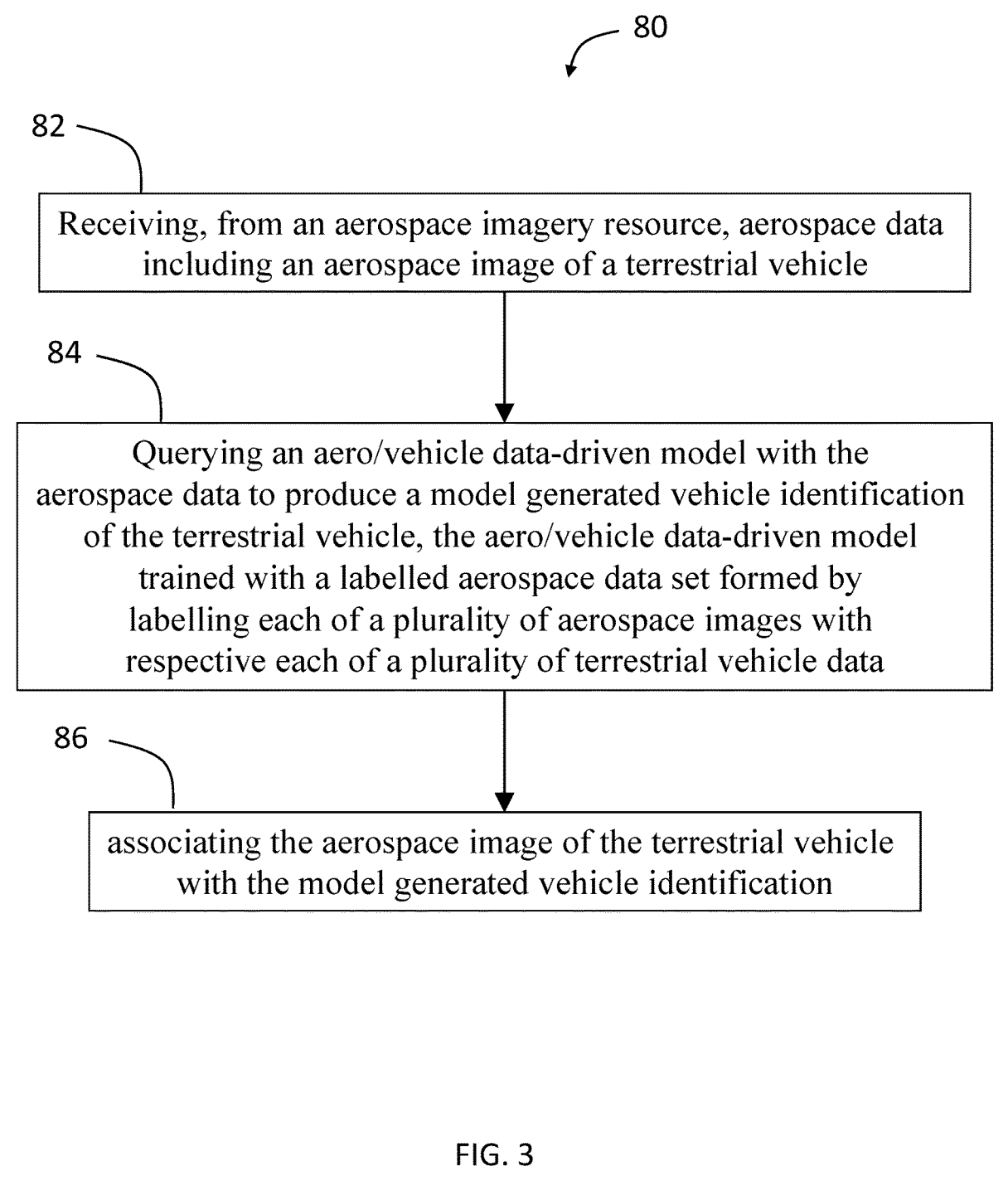

80

82

Receiving, from an aerospace imagery resource, aerospace data including an aerospace image of a terrestrial vehicle

84

Querying an aero/vehicle data-driven model with the aerospace data to produce a model generated vehicle identification of the terrestrial vehicle, the aero/vehicle data-driven model trained with a labelled aerospace data set formed by labelling each of a plurality of aerospace images with respective each of a plurality of terrestrial vehicle data

86 associating the aerospace image of the terrestrial vehicle with the model generated vehicle identification

FIG. 3

TERRESTRIAL TO AEROSPACE DATA-BASED MODEL SYSTEMS AND METHODS

CROSS-REFERENCE TO RELATED APPLICATIONS

The present application claims the benefit of U.S. Provisional Patent Application No. 63/321,265 entitled "TERRESTRIAL TO AEROSPACE DATA-BASED MODEL SYSTEMS AND METHODS," having a filing date of Mar. 18, 2022, which is incorporated herein by reference in its entirety.

TECHNICAL FIELD

The present disclosure generally relates to systems and methods useful to deploy a data-based model using aerospace imagery, and more particularly, but not exclusively, to systems and methods to train a data-based aerospace model using terrestrial data.

BACKGROUND

Providing the resilience to maintain imagery based data-based modeling in the event of an outage remains an area of interest. Some existing systems have various shortcomings relative to certain applications. Accordingly, there remains a need for further contributions in this area of technology.

SUMMARY

One embodiment of the present disclosure is a unique system and method to leverage terrestrial imagery for use in labelling aerospace imagery. Other embodiments include apparatuses, systems, devices, hardware, methods, and combinations for training a data-based model using aerospace imagery. Further embodiments, forms, features, aspects, benefits, and advantages of the present application shall become apparent from the description and figures provided herewith.

BRIEF DESCRIPTION OF THE FIGURES

FIG. 3 depicts a method useful to determine an identification of a vehicle from an aerospace imagery resource.

DETAILED DESCRIPTION OF THE ILLUSTRATIVE EMBODIMENTS

Figure 1A:
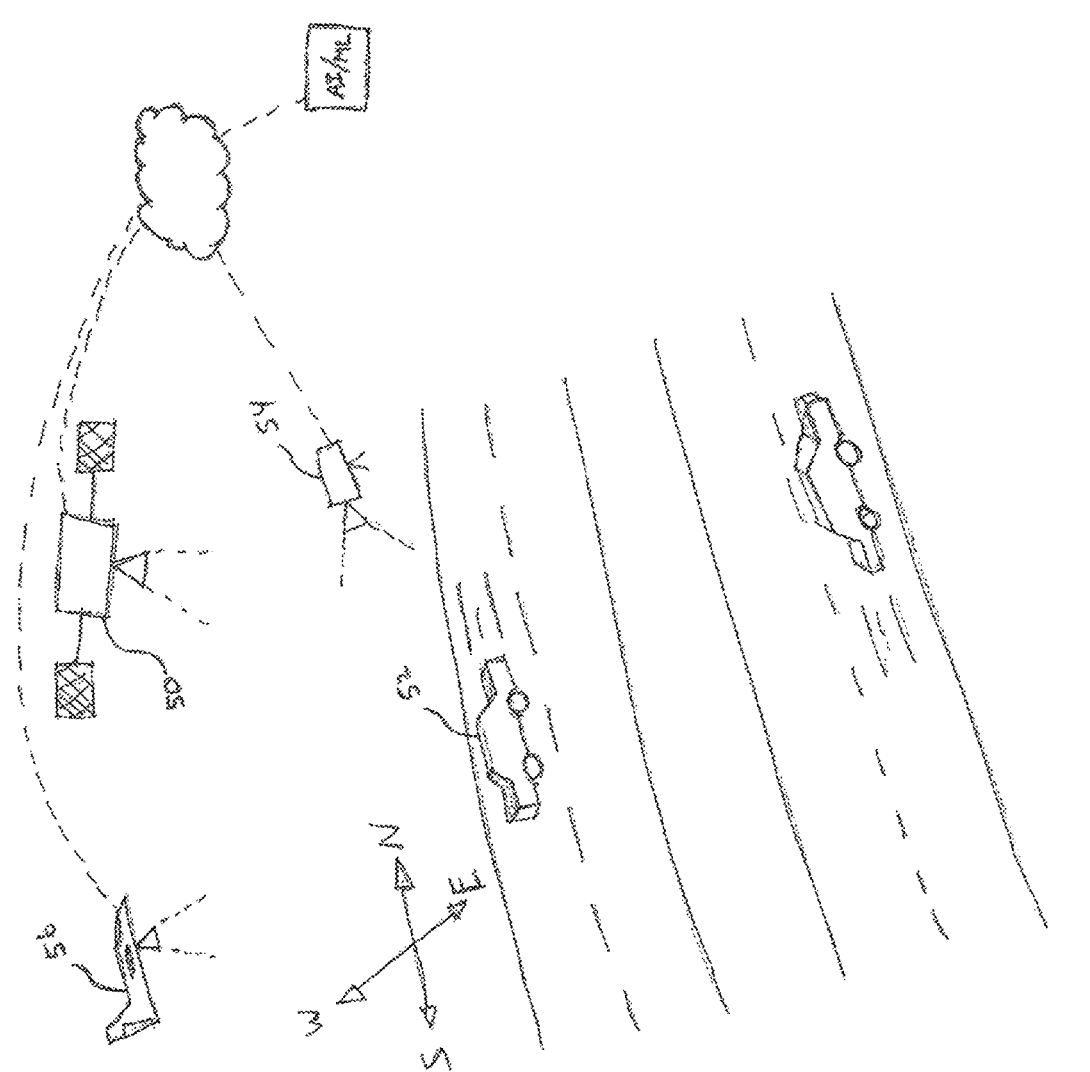
FIG. 1A depicts a schematic illustrating an embodiment of a machine learning model trained using terrestrial imaging data and capable of identifying a vehicle from an aerospace resource.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Disclosed herein is a system and method to utilize a terrestrial based imagery resource, such as a traffic camera, to capture images of passing vehicles for purposes of identifying the vehicles. The identification of the vehicles can be used to label respective images captured by an aerospace imagery resource of the vehicles. A labelled aerospace data set can be formed by a collection of labeled images using identification of vehicle provided from traffic camera and images from the aerospace imagery resource 53. An aerospace/vehicle data-driven model can be trained using the labelled aerospace data set, and thereafter the deployment of such a model in an operational setting.

Figure 1B:
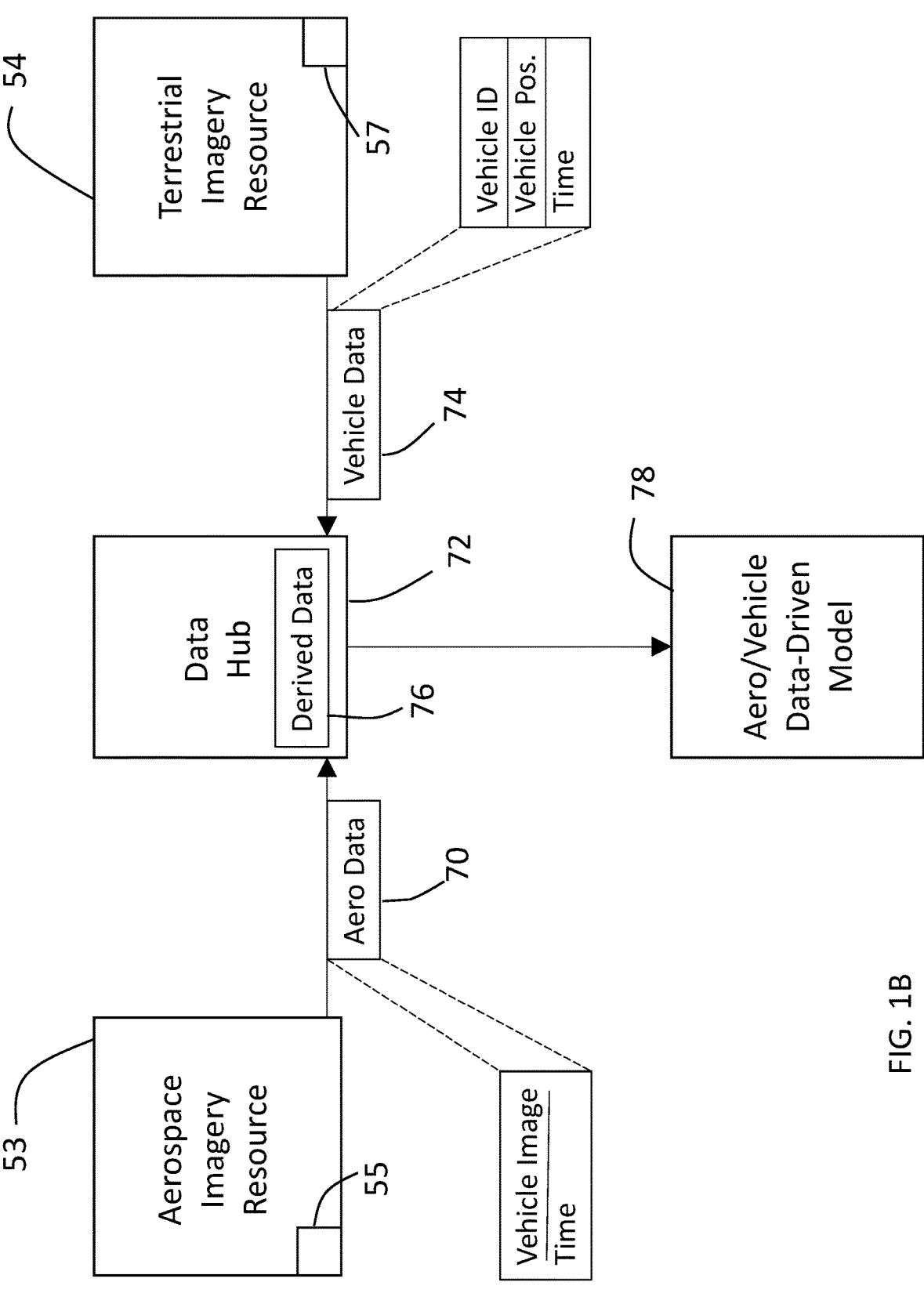
FIG. 1B depicts a schematic illustrating an embodiment of a machine learning model trained using terrestrial imaging data and capable of identifying a vehicle from an aerospace resource.

FIGS. 1A and 1B depict a satellite imagery resource 50 capable of imaging an object 52, along with a terrestrial based imagery resource 54 and/or an airborne imagery resource 56, both of which are also capable of imagining the object 52. As discussed further below, the satellite imagery resource 50 and airborne resource 56 can be alternatively and/or collectively referred to as aerospace imagery resources 53. The object 52 of interest to be imaged by any of the imagers 50, 54, and 56 can include any type of object, including but not limited to a specific automobile or even a type/model of automobile, a type of bus or specific bus, etc. For convenience of description, reference may be made below to the object in the form of an automobile, or more generically a vehicle, or terrestrial vehicle, but no limitation is intended to confine the object to any particular form.

The terrestrial based imagery resource 54 is contemplated to include one or more roadside cameras, whether fixed or moveable, useful to image automobiles and other modes of ground based transportation. Other types of imagers beyond a visible light camera are also contemplated as discussed further below. The terrestrial based imagery resource 52 can include freeway traffic cameras on an overpass configured to image, say, four lanes of traffic such as might be seen in a highway configuration of two lanes heading in each direction. It is also contemplated that the terrestrial based imagery resource 54 is of sufficient resolution to identify a specific automobile/bus/etc. and other relevant details such as color, make/model, damage, etc.

The aerospace imagery resource(s) 53 can also take on a variety of forms. For example, the airborne imagery resource 56 can be any of a variety of airborne platforms including a fixed wing vehicle, rotary wing vehicle, dirigible, glider, etc. The airborne imagery resource 56 can be inhabited or uninhabited, and, in some forms, can be remotely piloted and/or autonomous. With respect to the satellite imagery resource 50, it too can take on a variety of platforms capable of imagining in exoatmospheric or near-exoatmospheric conditions. The resource 50 can be either inhabited or uninhabited, and, in some forms, is capable of orbital flight at a variety of altitudes and inclination angles. The aerospace imagery resources are contemplated to include one or more cameras, whether fixed or moveable, useful to image automobiles and other modes of ground based transportation. Other types of imagers beyond a visible light camera are also contemplated for use with the airborne imagery resource 56 as discussed further below.

The imagery resources (e.g., either or both of terrestrial based imagery resource 54 and any of the aerospace imagery resources 53) can include any suitable image sensor, and not all resources need include the same type and/or capability of image sensor. As depicted in FIG. 1B, aerospace imagery resource(s) 53 can include an image sensor 55 and terrestrial imagery resource 54 can include an image sensor 57. In some forms the image sensors used in any of the resources 50, 54, and 56 can include sensors useful across the EM spectrum, including visible light, infrared, and near infrared. In some embodiments, the image sensors can take the form of a phased array radar, synthetic aperture radar, etc. In short, any suitable sensor capable of sensing electromagnetic (EM) radiation, if not also emitting EM radiation for use in sensing returned EM radiation, indicative of the presence of an object (e.g. a vehicle) is contemplated for use with the resources 50, 54, and 56. As will be appreciated, the imagery resources, whether aerospace 53 or terrestrial 54, can each include one or more image sensors.

As will be appreciated, image resolution from any of the imagery resources 50, 54, and 56 can vary. In some forms, the satellite imagery resource 50 may have lower resolution than either or both of the resources 54 and 56. Likewise, the resource 54 may have the best resolution of either resource 50 or 56.

In some embodiments of the instant application, image resolution from the terrestrial imagery resource 54 can be sufficient to read an identifying indicia on the vehicle for purposes of identifying the vehicle. Reading the indicia can be through character and/or object recognition, license plate readers, etc. For example, the image resolution may be sufficient to read a license plate or other identifying information (e.g. a U.S. Department of Transportation number, motor carrier number, etc.) and make that identification, or a correlate, available to other resources. An example of a correlate would be an identification apart from the particular license plate, USDOT or MC number, etc. A correlate can be an arbitrary identifier, whether alpha or numeric or alphanumeric, created by a third party. In some forms the correlate can be another officially designated number (e.g. a squad car number for local law enforcement painted on the roof of a given cruiser). For purposes herein, references may be made to "an identification" of the vehicle, where such identification is intended to include any one or more identifiers such as, but not limited to, the license plate, USDOT or MC number, or a correlate.

The identification of the vehicle 52 can be used to label the image for other uses. In some forms, the identification of the vehicle 52 can be provided as a label for that particular location and time of the presence of the vehicle 52 for use with images developed by other resources 50 and 56 of the same object (albeit from a different vantage point), discussed in some forms further below. Such a handoff of identification from images developed through the terrestrial resource 54 to the aerospace resource(s) 53 can be accomplished using a variety of techniques, including re-identification of the vehicle 53 from one image to another (e.g., object detection in conjunction with color of vehicle, location of vehicle).

In some embodiments, the identification can also include characteristics of the vehicle (manufacturer, brand, etc.) can also be derived from the image generated from the terrestrial based imagery source 54, where the characteristics can also be provided as labels additionally and/or alternative to the provision of labels discussed above using the identification of the vehicle. The characteristics can be derived by inspecting databases that relate identification of vehicle to one or more of the manufacturer or brand or type or color, etc. of the vehicle. In other additional and/or alternative embodiments, the image from the terrestrial imagery resource 54 may be used to further develop an artificial intelligence/machine learning data-driven model useful to identify specific vehicles and/or characteristics of the vehicles. Such a data-driven model can be used in the normal course of identification when capturing subsequent images from the resource 54 during deployment of the model, but the data-driven model can also be used to label objects for other uses. As used herein, reference to artificial intelligence/machine learning (AI/ML) data driven models include those derived from supervised techniques, unsupervised techniques, neural networks, deep learning, etc.

The labelled data made possible from the terrestrial based imagery resource 54 and provided using the techniques described above can be used to train an AI/ML data-driven model with image data from the aerospace imagery resources 50 and 56. FIG. 1B depicts an aero/vehicle data-driven model 78 produced using labelled data. The label generated based on data collected by the terrestrial resource 54 can be further identified with a specific direction of travel and/or a specific lane. If a car is in a southbound fast lane then the label can be developed for that location. When transferring the label determined from data collected by the terrestrial resource 54 to the aerospace imagery resource 50 and 56 which has a different viewing angle, the identification of the direction of travel and/or lane of travel can be useful to correctly locate and label the vehicle for training purposes of the aerospace resources 50 and 56.

Training of the AI/ML model on images from aerospace resources 50 and 56 can occur on the image from the aerospace imagery resources 50 and 56 that occur closest in time to the labelling event of the vehicle via the terrestrial based imagery source 54. Such chronological matching of images that occur closest in time can be useful in winnowing images for use in training. In some cases, the imagery sources 50 and 56 may have more than one image each which are viewing the same location as the terrestrial imagery resource 54 within an evaluation time period. If that is the case, all of the images from each of the imagery sources 50 and 56 within the evaluation time period can be trained with the labelled data, but in some circumstances a subset of images may be withheld for validation purposes. An AI/ML data-driven model useful with one or more of the aerospace imagery resources 50 and 54 can be created that outputs one or both of the identification of the vehicle and/or characteristics related to the vehicle when presented with an image from the resources 50 and 54 during deployment of the model. The ability to utilize an AI/ML model trained on images from resources 50 and 56 using labelled data derived from the resource 54 can be helpful during outages of resource 54.

As will be appreciated, a computing device is used in one or more places of the information chain implied in the discussion above. Such information chain includes generating digital data from an imager using any of the resources 50, 54, and 56; transmitting the digital data using any suitable device from the resources 50, 54, and 56; generating label data from the images captured by the resource 54; transferring the labels to images captured by the resources 50 and 56; and training a model using the labelled data transferred to the images captured by the resources 50 and 56. At any stage along the information chain one or more computing devices can be used.

Figure 2:
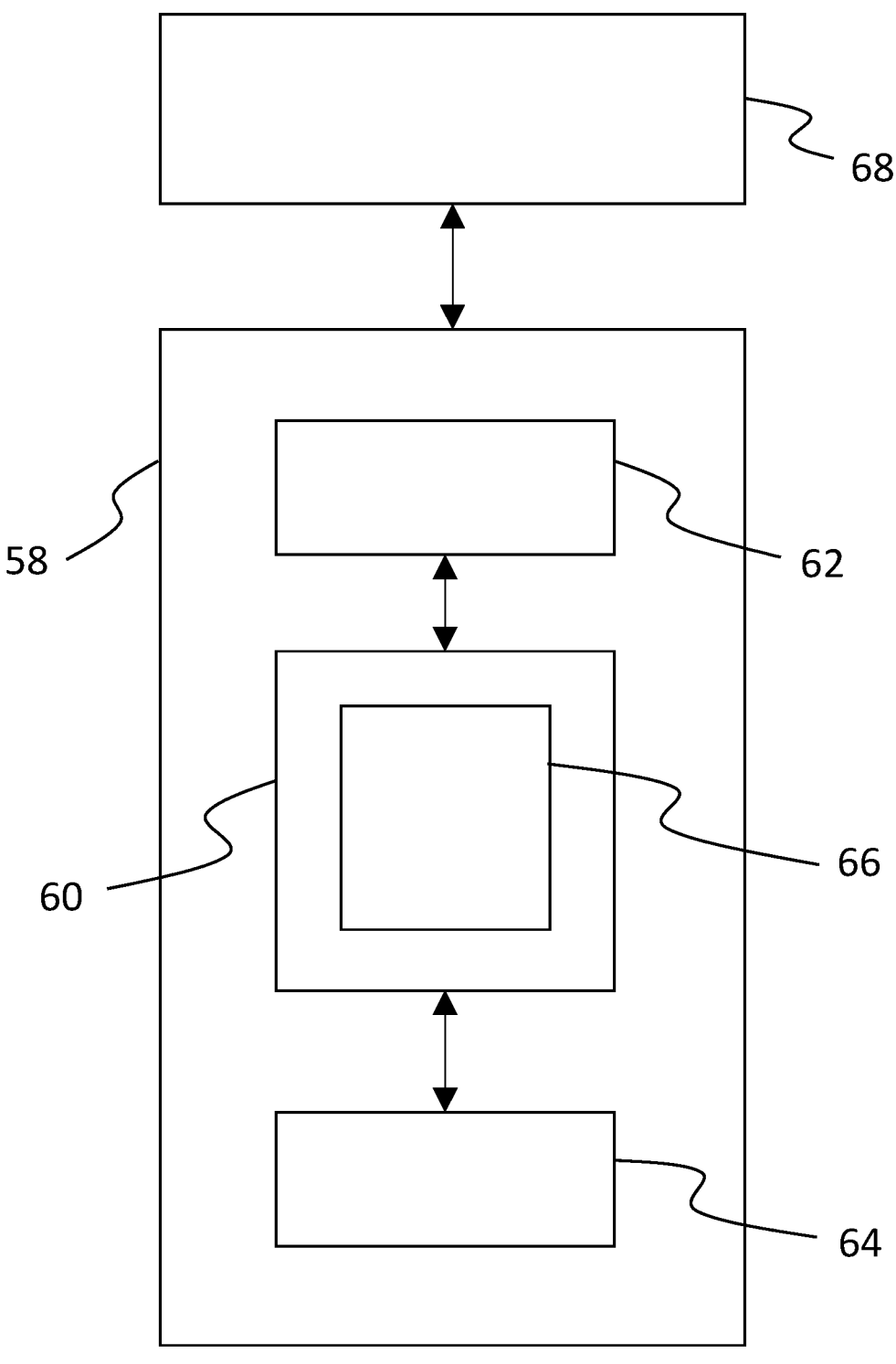
FIG. 2 depicts a computing device useful to aid in capturing images, transmitting images, or aiding in the training of a data-driven model using images captured from imager resources.

FIG. 2 depicts one embodiment of a computing device useful to provide the computational resources for the view sensors or for any device needed to collect and process data in the framework described with respect to FIG. 1. The computing device, or computer, 58 can include a processing device 60, an input/output device 62, memory 64, and operating logic 66. Furthermore, computing device 58 can be configured to communicate with one or more external devices 64. In some forms, the computing device can include one or more servers such as might be available through cloud computing.

The input/output device 62 may be any type of device that allows the computing device 58 to communicate with the external device 68. For example, the input/output device may be a network adapter, network card, or a port (e.g., a USB port, serial port, parallel port, VGA, DVI, HDMI, FireWire, CAT 5, or any other type of port). The input/output device 62 may be comprised of hardware, software, and/or firmware. It is contemplated that the input/output device 62 includes more than one of these adapters, cards, or ports.

The external device 68 may be any type of device that allows data to be inputted or outputted from the computing device 58. To set forth just a few non-limiting examples, the external device 68 may be another computing device, a printer, a display, an alarm, an illuminated indicator, a keyboard, a mouse, mouse button, or a touch screen display. In some forms, there may be more than one external device in communication with the computing device 58, such as for example another computing device structured to transmit to and/or receive content from the computing device 50. Furthermore, it is contemplated that the external device 68 may be integrated into the computing device 58. In such forms, the computing device 58 can include different configurations of computers 58 used within it, including one or more computers 58 that communicate with one or more external devices 64, while one or more other computers 58 are integrated with the external device 68.

Processing device 60 can be of a programmable type, a dedicated, hardwired state machine, or a combination of these; and can further include multiple processors, Arithmetic-Logic Units (ALUs), Central Processing Units (CPUs), Graphics Processing Units (GPU), or the like. For forms of processing device 60 with multiple processing units, distributed, pipelined, and/or parallel processing can be utilized as appropriate. Processing device 60 may be dedicated to performance of just the operations described herein or may be utilized in one or more additional applications. In the depicted form, processing device 60 is of a programmable variety that executes algorithms and processes data in accordance with operating logic 66 as defined by programming instructions (such as software or firmware) stored in memory 64. Alternatively or additionally, operating logic 66 for processing device 60 is at least partially defined by hardwired logic or other hardware. Processing device 60 can be comprised of one or more components of any type suitable to process the signals received from input/output device 62 or elsewhere, and provide desired output signals. Such components may include digital circuitry, analog circuitry, or a combination of both.

Memory 64 may be of one or more types, such as a solid-state variety, electromagnetic variety, optical variety, or a combination of these forms. Furthermore, memory 64 can be volatile, nonvolatile, or a mixture of these types, and some or all of memory 64 can be of a portable variety, such as a disk, tape, memory stick, cartridge, or the like. In addition, memory 64 can store data that is manipulated by the operating logic 66 of processing device 60, such as data representative of signals received from and/or sent to input/output device 62 in addition to or in lieu of storing programming instructions defining operating logic 66, just to name one example.

Returning now specifically to FIG. 1B, and with continuing reference to FIG. 1A, aerospace imagery resource 53 is configured to transmit aerospace data 70 to a data hub 72, while terrestrial imagery resource 54 is configured to transmit terrestrial vehicle data 74 to the data hub 72. It is contemplated that transmission of aerospace data 70 and terrestrial vehicle data 74 to the data hub 72 can be through any suitable communication, and in one form are conducted through wireless communication. In one embodiment, the terrestrial vehicle data 71 can be transmitted through wired communication. In one form, the data hub 72 can be cloud based (as depicted in FIG. 1A). The terrestrial vehicle data 74 can include any suitable content including, but not limited to, an image of the vehicle 52. In some embodiments, however, the terrestrial imagery resource 54 is capable of processing data collected using image sensor 57, including the determination of vehicle identification (e.g., any of the identifier, characteristics, etc. discussed herein), vehicle position, and time. In the embodiment depicted in FIG. 1B, the terrestrial vehicle data 74 includes vehicle identification, vehicle position, and time. In some embodiments, the data hub 72 can also be used to determine derived data 76, where such derived data 76 may include a vehicle identification (e.g., through the use of a license plate reader to determine a license plate identifier). Thus, it is contemplated that the data hub 74 can be used to collect data from resources 53 and 54, and can also be used in some forms to process the data to produce derived data 76.

The aerospace vehicle data 70 can include any suitable content including, but not limited to, an image of the vehicle 52 and a time that the image was captured. Similar to the terrestrial imagery resource 54, the aerospace imagery resource 54 can process data prior to transmission to the data hub 72 such as, but not limited to, position of the vehicle 52. The data hub 72 may also process the aerospace vehicle data 70 to create derived data 76 based on the aerospace vehicle data 70.

The data hub 72 can be used to train the aero/vehicle data-driven model 78 by applying labels provided or determined from the terrestrial vehicle data 74 to images provided by the aerospace data 70. A plurality of labels and images can be used to create a plurality of labelled vehicles 52 to form a labelled aerospace data set. The labelled aerospace data set can be used to train the aero/vehicle data driven model 78 useful to identify the identification of a terrestrial vehicle using images obtained from the aerospace imagery resource with the trained model. As will be appreciated, some of the labelled aerospace data set can be set aside for validation testing. After training of the aero/vehicle data-driven model, one or more subsequent images captured by the aerospace imagery resource 53 can be used as input to the aero/vehicle data-driven model which subsequently can produce as output a model generated vehicle identification associated with the one or more subsequent images. The model generated vehicle identification of a vehicle through use of the aero/vehicle data-driven model using subsequent images from the aerospace imagery resource 53 can be displayed/recorded/archived/etc. in any number of manners. For example, the model generated vehicle identification can be used as a label applied to the subsequent aerospace image as the subsequent image is displayed (e.g., on a computer display) for purposes of information conveyance. The model generated vehicle identification can also be archived in a database of time/position occurrences of detection of the vehicle.

Turning now to FIG. 3, one embodiment of a method 80 depicting steps useful to determine an identification of a vehicle from an aerospace imagery resource 53. Step 82 includes receiving, from an aerospace imagery resource 53, aerospace data 70 including an aerospace image of a terrestrial vehicle 52. Step 84 includes querying an aero/vehicle data-driven model 78 with the aerospace data 70 to produce a model generated vehicle identification of the terrestrial vehicle 52, the aero/vehicle data-driven model 78 trained with a labelled aerospace data set formed by labelling each of a plurality of aerospace images with respective each of a plurality of terrestrial vehicle data 74. Step 86 includes associating the aerospace image of the terrestrial vehicle 52 with the model generated vehicle identification.

The aerospace/vehicle data-driven model provides an improvement in remote sensing and identification. While the use of traffic cameras and the like are helpful to identify vehicles in an urban environment, when those cameras are not available, or when a vehicle is travelling in a suburban or rural environment without use of traffic cameras, remote sensing images can be used with the aerospace/vehicle data-driven model to provide a remote identification of the vehicle. In addition, terrestrial cameras are distributed at fixed locations which limit tracking of vehicles between the fixed locations. The model trained using techniques described herein can provide labelling of vehicles in images provided from aerospace imagery resources. Further, in high density locations where speed may be important in tracking vehicles, labelling of vehicles in images provided from aerospace imagery resources can provide important benefits including differentiation of vehicle identity as well as real-time tracking of vehicles.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A non-transitory computer-readable medium storing one or more instructions that, when executed by one or more processors, are configured to cause the one or more processors to perform operations comprising:

receiving, from an aerospace imagery resource, aerospace data including an aerospace image of a terrestrial vehicle; and querying an aero/vehicle data-driven model with the aerospace data to produce a model generated vehicle identification of the terrestrial vehicle, the aero/vehicle data-driven model trained with a labelled aerospace data set formed by labelling each of a plurality of aerospace images with respective each of a plurality of terrestrial vehicle data;

associating the aerospace image of the terrestrial vehicle with the model generated vehicle identification.

2. The non-transitory computer-readable medium of claim 1, which further includes receiving, from a terrestrial based imagery resource, terrestrial vehicle data indicative of an identification of a vehicle.

3. The non-transitory computer-readable medium of claim 2, which further includes inspecting the terrestrial vehicle data to produce an identifier of the terrestrial vehicle.

4. The non-transitory computer-readable medium of claim 3, wherein the identification of the terrestrial vehicle includes a characteristic of the terrestrial vehicle.

5. The non-transitory computer-readable medium of claim 4, wherein the characteristic of the terrestrial vehicle includes at least one of a manufacturer of the terrestrial vehicle, type of vehicle, and color of vehicle.

6. The non-transitory computer-readable medium of claim 3, which further includes querying a database using the identifier to return a database query result including a characteristic of the terrestrial vehicle.

7. The non-transitory computer-readable medium of claim 1, which further includes labelling the aerospace data from the aerospace imagery resource with the terrestrial vehicle data from the terrestrial based imagery resource to create a labelled aerospace data set.

8. The non-transitory computer-readable medium of claim 1, which further includes training the aero/vehicle data-driven model with the labelled aerospace data set, wherein as a result of the training the data-driven model is structured to produce the model generated vehicle identification as an output when presented with a new aerospace data including a new aerospace image of the terrestrial vehicle.

9. The non-transitory computer-readable medium of claim 1, wherein the aerospace data includes a plurality of images of the terrestrial vehicle, and wherein a subset of the plurality of images are designated as a validation data set.

10. The non-transitory computer-readable medium of claim 1, wherein the aerospace imagery resource includes an exoatmospheric platform having an image sensor.

11. The non-transitory computer-readable medium of claim 10, wherein the image sensor includes at least one of a phased array radar, synthetic aperture radar, visible light camera, infrared sensor, and near infrared sensor.

12. A method for identifying a terrestrial vehicle, the method comprising:

receiving, from an aerospace imagery resource, aerospace data including an aerospace image of a terrestrial vehicle; and querying an aero/vehicle data-driven model with the aerospace data to produce a model generated vehicle identification of the terrestrial vehicle, the aero/vehicle data-driven model trained with a labelled aerospace data set formed by labelling each of a plurality of aerospace images with respective each of a plurality of terrestrial vehicle data;

associating the aerospace image of the terrestrial vehicle with the model generated vehicle identification.

13. The method of claim 11, wherein the aero/vehicle data-driven model is trained by receiving, from a terrestrial based imagery resource, a terrestrial image of the terrestrial vehicle.

14. The method of claim 13, which further includes generating an identifier of the terrestrial vehicle based on the terrestrial image of the terrestrial vehicle.

15. The method of claim 14, which further includes querying a database using the identifier to return a database query result including a characteristic of the terrestrial vehicle.

16. The method of claim 15, wherein the characteristic of the terrestrial vehicle includes at least one of a manufacturer of the terrestrial vehicle, type of vehicle, and color of vehicle, and wherein the aero/vehicle data-driven model is trained using the characteristic.

17. The method of claim 11, wherein the labelled aerospace data set is compiled by chronologically matching a terrestrial image of the vehicle with the aerospace image of the vehicle.

18. The method of claim 11, wherein the aerospace data includes a plurality of images of the terrestrial vehicle, and wherein a subset of the plurality of images are designated as a validation data set.

19. The method of claim 11, which further includes labelling the aerospace data from the aerospace imagery resource with the terrestrial vehicle data from the terrestrial based imagery resource to create the labelled aerospace data set.

20. The method of claim 11, which further includes training the aero/vehicle data-driven model with the labelled aerospace data set, wherein as a result of the training the data-driven model is structured to produce the model generated vehicle identification as an output when presented with a new aerospace data including a new aerospace image of the terrestrial vehicle.

* * * * *